United States Patent
Kang

(10) Patent No.: US 10,577,021 B2
(45) Date of Patent: Mar. 3, 2020

(54) VEHICLE SUB-FRAME

(71) Applicants: Hyundai Motor Company, Seoul (KR); Kia Motors Corporation, Seoul (KR)

(72) Inventor: Byung Gu Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/815,323

(22) Filed: Nov. 16, 2017

(65) Prior Publication Data
US 2018/0327030 A1 Nov. 15, 2018

(30) Foreign Application Priority Data
May 10, 2017 (KR) .................. 10-2017-0058193

(51) Int. Cl.
*B62D 21/11* (2006.01)
*B62D 21/09* (2006.01)
*B62D 29/00* (2006.01)

(52) U.S. Cl.
CPC .............. *B62D 21/11* (2013.01); *B62D 21/09* (2013.01); *B62D 29/005* (2013.01)

(58) Field of Classification Search
CPC ........ B62D 25/20; B62D 21/11; B62D 21/02; B62D 29/008; B62D 21/00; B62D 25/2018; B62D 25/2036
USPC ........... 296/204, 193.07, 187.09, 29, 187.08, 296/203.04, 205, 209, 146.11
See application file for complete search history.

(56) References Cited

U.S. PATENT DOCUMENTS

| | | | | |
|---|---|---|---|---|
| 2,116,771 A * | 5/1938 | Seaman | ................ | B60R 13/083 |
| | | | | 181/290 |
| 3,888,531 A * | 6/1975 | Straza | ..................... | B60R 19/18 |
| | | | | 293/120 |
| 4,606,959 A * | 8/1986 | Hillinger | ................... | B32B 3/12 |
| | | | | 428/116 |
| 4,898,419 A | 2/1990 | Kenmochi et al. | | |
| 5,927,647 A * | 7/1999 | Masters | .................... | F02K 1/72 |
| | | | | 239/265.19 |
| 6,467,917 B1 * | 10/2002 | Lang | ..................... | B60R 1/0605 |
| | | | | 359/838 |
| 8,641,066 B2 | 2/2014 | Kudla et al. | | |
| 8,894,135 B2 * | 11/2014 | Togo | ...................... | B62D 25/20 |
| | | | | 296/208 |
| 9,085,329 B2 * | 7/2015 | Komiya | ................. | B62D 21/11 |
| 9,487,168 B2 * | 11/2016 | Yabu | ...................... | B60R 19/03 |

(Continued)

FOREIGN PATENT DOCUMENTS

| | | |
|---|---|---|
| JP | 6-206575 A | 7/1994 |
| JP | 2016-43926 A | 4/2016 |

(Continued)

*Primary Examiner* — D Glenn Dayoan
*Assistant Examiner* — Sunsurraye Westbrook
(74) *Attorney, Agent, or Firm* — Morgan, Lewis & Bockius LLP

(57) ABSTRACT

A vehicle sub-frame may include a reinforcement member having a honeycomb structure between upper and lower panels to secure the overall rigidity of the sub-frame, wherein the reinforcement member is additionally disposed in the sub-frame to secure the torsional and flexural strengths of the sub-frame.

9 Claims, 6 Drawing Sheets

(56) References Cited

U.S. PATENT DOCUMENTS

2012/0153669 A1\*  6/2012  Nagwanshi .......... B62D 29/005
                                                296/187.08
2015/0298739 A1\*  10/2015  Buschjohann ......... B62D 21/02
                                                296/193.08

FOREIGN PATENT DOCUMENTS

KR    10-2013-0099303 A      9/2013
WO    WO 2013/175026 A1    11/2013

\* cited by examiner

VEHICLE SUB-FRAME

CROSS-REFERENCE(S) TO RELATED APPLICATIONS

The present application claims priority to Korean Patent Application No. 10-2017-0058193, filed on May 10, 2017, the entire contents of which is incorporated herein for all purposes by this reference.

BACKGROUND OF THE INVENTION

Field of the Invention

The present invention relates to a vehicle sub-frame, and, more particularly, to a vehicle sub-frame that has excellent torsional and flexural strengths, as well as overall rigidity.

Description of Related Art

In general, Macpherson-type suspensions are applied to small vehicles. Such a suspension includes a strut bar disposed to connect the upper side of a knuckle arm and a vehicle body, a spring disposed to the strut bar, a steering gearbox, a stabilizer bar, and the like disposed at the upper portion thereof in a vehicle's width direction, lower arms disposed at both front and rear portions thereof, and a sub-frame connected to the lower side of the knuckle arm.

The sub-frame is configured to support members, such as a steering system, a transmission, and an engine, to reduce vibration and noise, and increase the rigidity of the vehicle body.

The sub-frame includes a main body including an upper plate and a lower plate, which are detachably coupled to each other, and suspension arms are mounted to both side end portions of the main body. The sub-frame must have sufficient rigidity as a whole, since the sub-frame supports a gearbox, a variety of links, chassis members including stabilizers, and an engine, and also must have a robust structure against torsion and bending since the sub-frame is connected to the vehicle body to serve as a frame.

However, it is difficult for the present conventional sub-frame to have sufficient rigidity since it includes only the upper and lower plates coupled to each other. The conventional sub-frame is designed without considering torsional and flexural strengths even though the sub-frame is designed considering rigidity.

The information disclosed in the present Background of the Invention section is only for enhancement of understanding of the general background of the invention, and should not be taken as acknowledgment or any form of suggestion that the present information forms the prior art already known to a person skilled in the art.

BRIEF SUMMARY

Various aspects of the present invention are directed to providing a vehicle sub-frame that has torsional and flexural strength as well as overall rigidity.

In accordance with various exemplary embodiments of the present invention, a vehicle sub-frame including an upper panel and a lower panel coupled under the upper panel further includes a reinforcement member disposed between the upper panel and the lower panel, the reinforcement member having a honeycomb structure in which columns with a specific pattern are continuously stacked.

The reinforcement member may include a first honeycomb member which is formed to cover a whole upper surface of the lower panel and in which columns are stacked in a forward and rearward direction and in a lateral direction when the columns are erected on the lower panel.

The reinforcement member of the first honeycomb member may have a center portion that is recessed downward.

The reinforcement member may include a plurality of second honeycomb members which are disposed at both sides of the lower panel, extending in the forward and rearward direction and in which columns are vertically stacked.

The lower panel may be provided with a plurality of mounting brackets, and the second honeycomb members may surround the mounting brackets when the mounting brackets are disposed through the lower panel.

The second honeycomb members may be disposed to pass through the first honeycomb member at both sides of the lower panel in the forward and rearward direction thereof.

The reinforcement member may include third honeycomb members which are disposed at the front and rear portions of the lower panel, extending laterally and in which columns are vertically stacked.

The third honeycomb members may be disposed to laterally pass through the first honeycomb member in a front and rear portion thereof.

The second honeycomb members may be disposed in an upper portion of the lower panel and the third honeycomb members may be disposed in a lower portion of the upper panel, wherein the second honeycomb members intersect with the third honeycomb members.

The upper and lower panels may include a steel material, and the reinforcement member may include a plastic material.

As apparent from the above description, since the vehicle sub-frame having the above-mentioned structure includes the reinforcement member having the honeycomb structure between the upper panel and the lower panel, securing the overall rigidity of the sub-frame.

In addition, the reinforcement member can be additionally disposed to the sub-frame to secure the torsional and flexural strengths of the sub-frame. Since the reinforcement member includes a plastic material configured to reduce the weight thereof, it is possible to optimally apply the sub-frame to the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
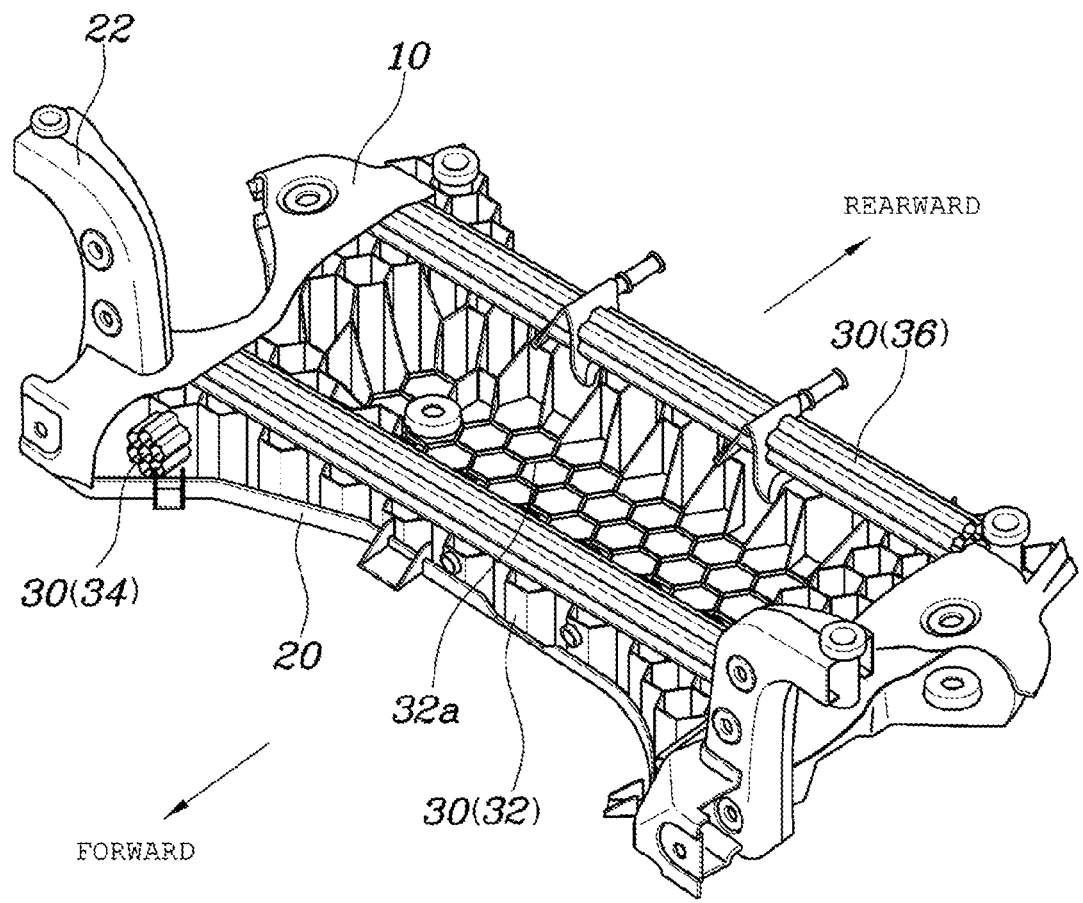
FIG. 1 is a view illustrating a vehicle sub-frame according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
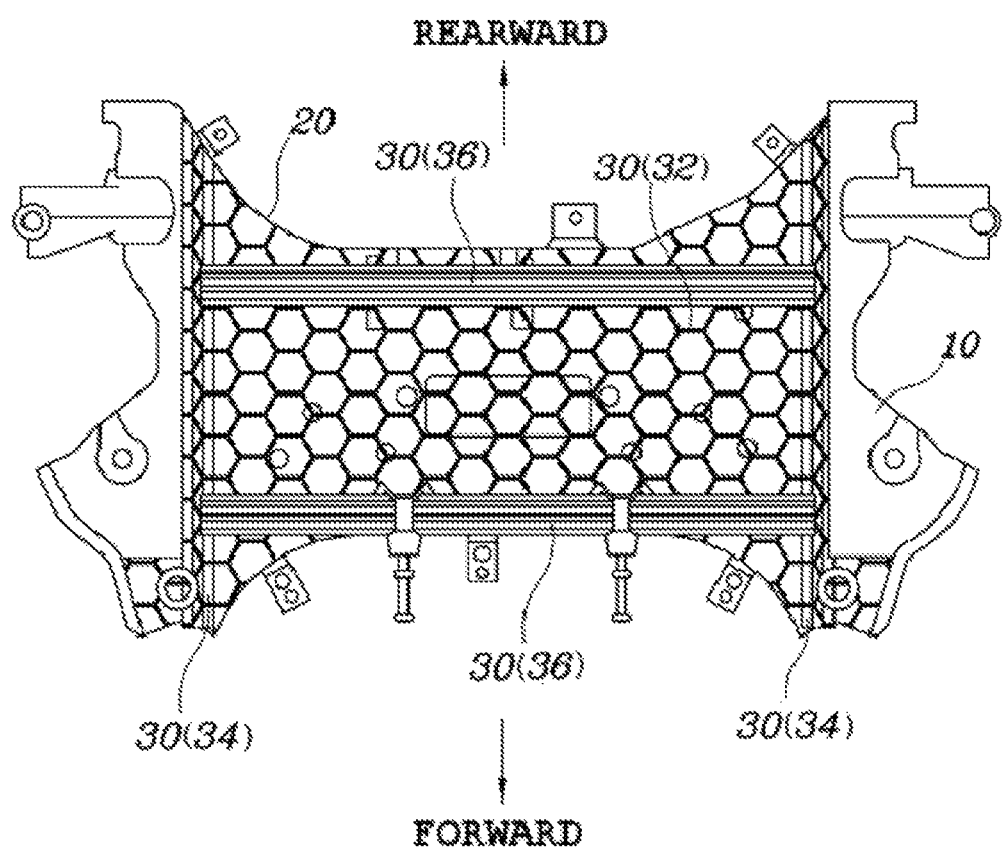
FIG. 2 is a top view illustrating the vehicle sub-frame of FIG. 1.
Figure 3:
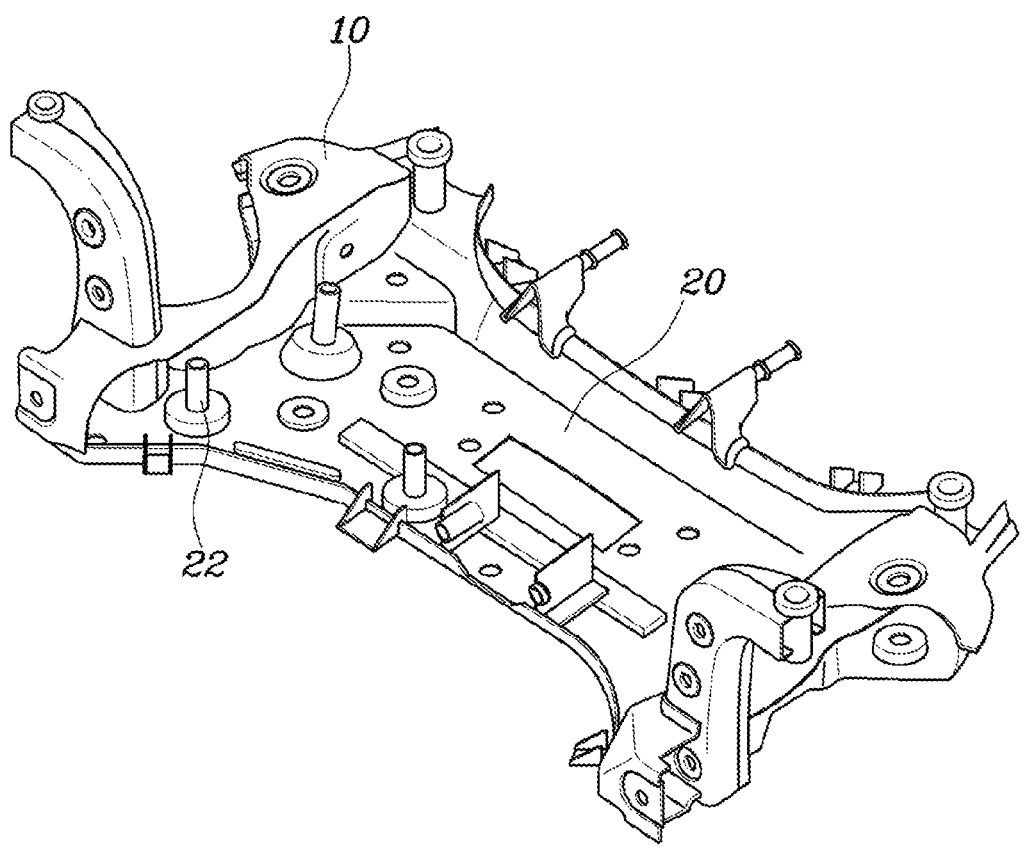
FIG. 3, FIG. 4, FIG. 5, and FIG. 6 are views for explaining the vehicle sub-frame.

FIG. 1 is a view illustrating a vehicle sub-frame according to an exemplary embodiment of the present invention. FIG. 2 is a top view illustrating the vehicle sub-frame of FIG. 1. FIG. 3, FIG. 4, FIG. 5, and FIG. 6 are views for explaining the vehicle sub-frame.

An upper panel 10 and a lower panel 20 are illustrated in the drawings, wherein the upper panel 10 is illustrated in a cutaway view to show a reinforcement member 30 disposed in the lower panel 20 in detail.

As illustrated in FIG. 1 and FIG. 2, the vehicle sub-frame according to the exemplary embodiment of the present invention includes an upper panel 10 and a lower panel 20 coupled under the upper panel 10, and further includes a reinforcement member 30 that is disposed between the upper panel 10 and the lower panel 20 and has a honeycomb structure in which columns with a specific pattern are continuously stacked.

The present invention can secure torsional and flexural strength as well as rigidity in a specific direction since the vehicle sub-frame includes the reinforcement member 30 disposed between the upper panel 10 and the lower panel 20, and the reinforcement member 30 has the honeycomb structure in which the specifically patterned columns are stacked. That is, the sub-frame has sufficient rigidity wherein the lower and upper panels 20 and 10 may support components including an engine utilizing the reinforcement member 30 having the honeycomb structure. In addition, the sub-frame is structurally stable since it has a robust structure against torsion and bending even when the sub-frame is connected to a vehicle body to serve as a frame.

Here, the reinforcement member 30 has the honeycomb structure having a specific pattern of a hexagonal shape, for example, so that the surfaces and edge portions of the specifically patterned columns are effectively engaged with each other during stacking, securing a support force with sufficient rigidity in a direction in which the specific pattern is viewed while facilitating shock absorption in a surface direction thereof. Thus, it is possible to effectively cope with loads of torsion and bending applied to the lower and upper panels 20 and 10.

The reinforcement member 30 in an exemplary embodiment of the present invention may be configured to secure the torsional and flexural strengths of the sub-frame as well as the overall rigidity thereof. Accordingly, the reinforcement member 30 includes first, second and third honeycomb members 32, 34, and 36 respectively, each formed in a different manner according to the stacking direction of the columns of the honeycomb structure.

The exemplary embodiment of the present invention having such a configuration will be described below in detail. As illustrated in FIG. 1, FIG. 2, FIG. 3, FIG. 4, and FIG. 5, the reinforcement member 30 may include the first honeycomb member 32 which is formed to substantially cover the whole upper surface of the lower panel 20, and in which columns are stacked in a forward and rearward direction and in a lateral direction thereof.

Accordingly, the reinforcement member 30 includes the first honeycomb member 32 which covers the lower panel 20. The first honeycomb member 32 is formed to cover the front face of the lower panel 20 and has the honeycomb structure in which the specifically patterned columns are stacked in the forward and rearward direction and in the lateral direction wherein the specific pattern is aligned when vertically viewed. That is, since the specifically patterned columns are stacked due to the characteristic of the honeycomb structure, it is possible to secure sufficient strength in the direction in which the specific pattern is viewed. Thus, the first honeycomb member 32 may secure rigidity for supporting chassis members and an engine disposed above the lower and upper panels 20 and 10 since the columns of the first honeycomb member 32 are stacked in the forward-rearward and lateral directions of the lower panel 20 wherein the specific pattern is vertically viewed.

The reinforcement member 30 of the first honeycomb member 32 has a center portion 32a that is recessed downward to secure a region for accommodating a gearbox mounted to the upper panel 10. That is, the first honeycomb member 32 is formed to cover the lower panel 20 and correspond to the shape of the upper panel 10 coupled above the lower panel 20, with the consequence that the chassis members, the engine, and the like may be disposed thereto and robustly supported by the sub-frame.

Figure 4:
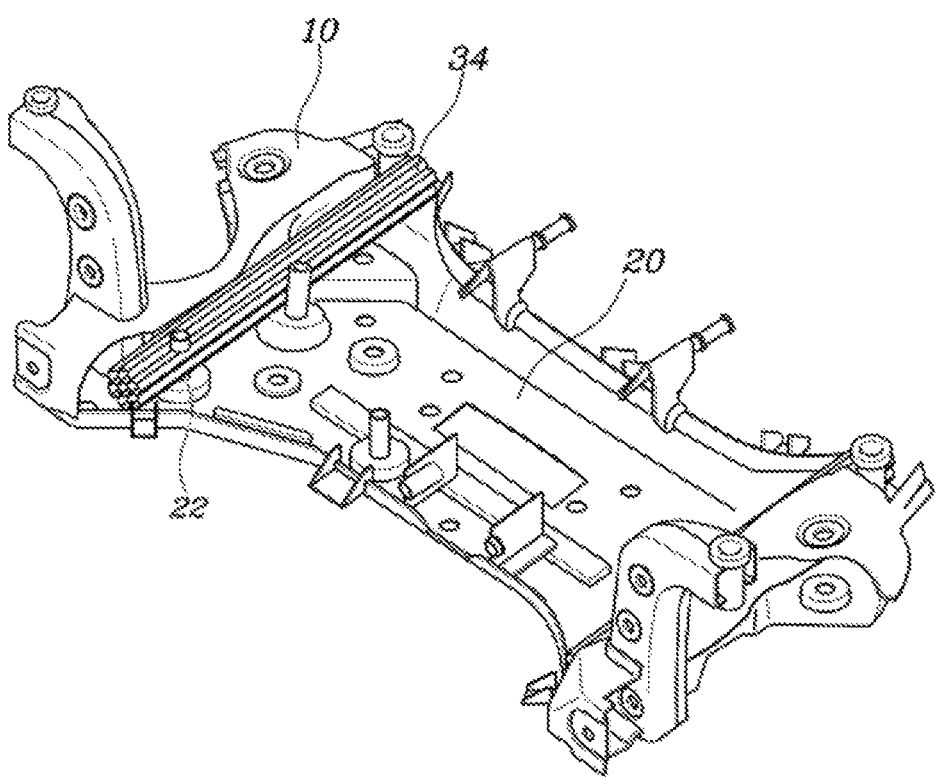
Figure 5:
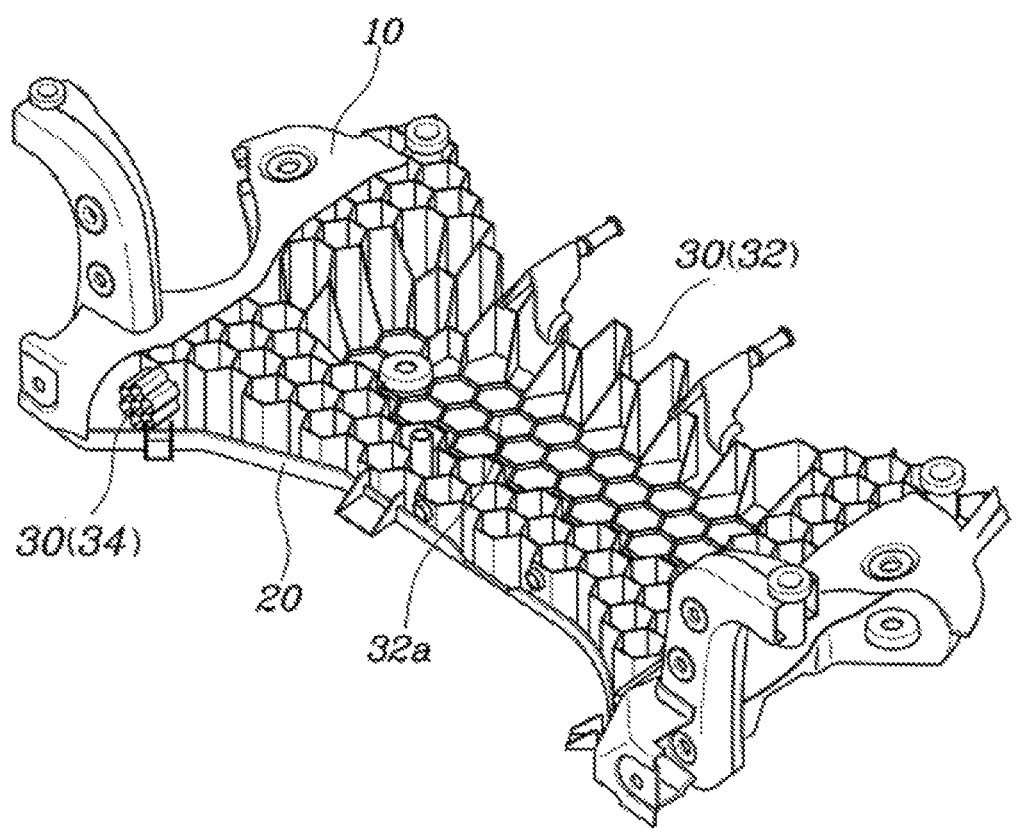

As illustrated in FIG. 2 and FIG. 4, the reinforcement member 30 may include the second honeycomb members 34 which are disposed at both sides of the lower panel 20 and extend in the forward and rearward direction and in which columns are vertically stacked.

Accordingly, the reinforcement member 30 further includes the second honeycomb members 34. The second honeycomb members 34 are disposed at both sides of the lower panel 20 and have the honeycomb structure in which the specifically patterned columns are vertically stacked wherein the specific pattern is viewed in the forward and rearward direction thereof. The second honeycomb members 34 are configured to secure strength against the torsion and bending applied to the lower panel 20 in the forward and rearward direction thereof. The columns of the second honeycomb members 34 are stacked in the vertical direction of the lower panel 20, wherein the end portions of the stacked columns are directed in the forward and rearward direction of the lower panel. That is, since the specifically patterned columns are vertically stacked due to the characteristic of the honeycomb structure, torsion and bending are allowed at the circumferential surfaces of the stacked columns. Thus, the second honeycomb members 34 secure torsional and flexural strength as well as rigidity at both sides of the lower panel 20 while having a robust structure against a lateral force generated when the vehicle turns.

Meanwhile, the lower panel 20 is provided with a plurality of mounting brackets 22 for connection with the vehicle body and the chassis members. Since the disposition positions of the mounting brackets 22 vary depending on the vehicle to which the sub-frame is applied, the mounting brackets 22 may be disposed in different positions with no limitation to the drawings of the present invention.

The second honeycomb members 34 may surround the mounting brackets 22 when the mounting brackets 22 disposed in the lower panel 20 pass through the second honeycomb members. Accordingly, the stacked second honeycomb members 34 may have disposition holes through which the mounting brackets 22 of the lower panel 20 pass through, wherein the mounting brackets are fitted into the disposition holes, and the second honeycomb members 34 may robustly support the mounting brackets 22 since they surround the mounting brackets 22.

In addition, the second honeycomb members 34 may be disposed to pass through the first honeycomb member 32 in both sides of the reinforcement member 30 of the first honeycomb member 32 in the forward and rearward direction thereof. Since the second honeycomb members 34 extend transversely in the forward and rearward direction to be disposed at both sides of the reinforcement member 30 of the first honeycomb member 32, contact between the first honeycomb member 32 and the second honeycomb members 34 may be maintained. Accordingly, the second honeycomb members 34 are disposed to pass through the first honeycomb member 32 in both sides of the reinforcement member 30 of the first honeycomb member, and contact between the first honeycomb member 32 and the second honeycomb member 34 is maintained. Therefore, the second honeycomb member 34 allow for a more robust and effective support structure by dispersing loads due to the disposition of vehicle members and the torsion transferred when the vehicle travels.

Figure 6:
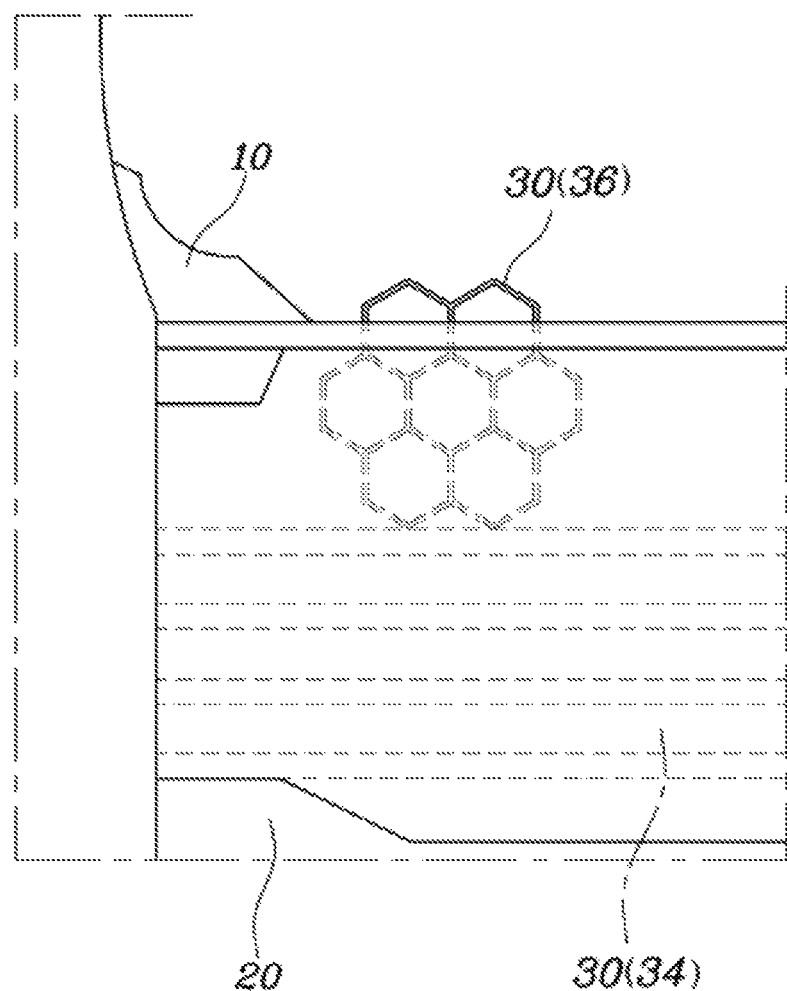

As illustrated in FIG. 1 and FIG. 6, the reinforcement member 30 may include the third honeycomb members 36 which are disposed at the front and rear portions of the lower panel 20 and extend laterally and in which columns are vertically stacked.

Accordingly, the reinforcement member 30 further includes the third honeycomb members 36 in addition to the first and second honeycomb members 32 and 34. The third honeycomb members 36 are disposed at the front and rear portions of the lower panel 20 and have the honeycomb structure in which the specifically patterned columns are vertically stacked wherein the specific pattern is laterally viewed. The third honeycomb members 36 are configured to secure strengths against the torsion and bending applied to the lower panel 20 in the lateral direction thereof. Since the columns of the third honeycomb members 36 are stacked in the vertical direction of the lower panel 20, the end portions of the stacked columns are viewed in the sides of the lower panel. Thus, the third honeycomb members 36 secure torsional and flexural strengths in the lateral direction as well as rigidity at the front and rear portions of the lower panel 20 while having a robust structure against the lateral force generated when the vehicle turns.

The third honeycomb members 36 may be disposed to laterally pass through the first honeycomb member 32 in the front and rear portions of the lower panel. Since the third honeycomb members 36 are disposed at the front and rear portions of the lower panel and extend laterally to traverse the front and rear sides of the lower panel, contact between the first honeycomb member 32 and the third honeycomb members 36 may be maintained. Therefore, the third honeycomb members 36 allow for a more robust and effective support structure by dispersing loads due to the disposition of the chassis members, the engine, and the like, and torsion transferred when the vehicle travels.

Meanwhile, the second honeycomb members 34 are disposed in the upper portion of the lower panel 20 and the third honeycomb members 36 are disposed in the lower portion of the upper panel 10, and thus they may be disposed wherein the second honeycomb members 34 intersect with the third honeycomb members 36. The second and third honeycombs 34, 36 may contact each other or not.

That is, since the second honeycomb members 34 are disposed at both sides of the lower panel 20 and extend in the forward and rearward direction, and the third honeycomb members 36 are disposed at the front and rear portions of the lower panel 20 and extend laterally, the second honeycomb members 34 may interfere with the third honeycomb members 36. Therefore, the second honeycomb members 34 are disposed in the upper portion of the lower panel 20 and the third honeycomb members 36 are disposed in the lower portion of the upper panel 10 wherein the second and third honeycomb members 34 and 36 have a stable structure.

Since the second and third honeycomb members 34 and 36 are disposed to intersect in the upward and downward direction, the second honeycomb members 34 are in contact with the third honeycomb members 36. Therefore, the second and third honeycomb members 34 and 36 together with the first honeycomb member 32 may effectively support loads by dispersing loads due to the disposition of the chassis members, the engine, and the like, and torsion transferred when the vehicle travels. Of course, the second and third honeycomb members 34 and 36 may also be disposed wherein they intersect through each other. However, when the second and third honeycomb members 34 and 36 are configured wherein they penetrate each other, the second and third honeycomb members 34 and 36 may have a large size for the overall rigidity of the sub-frame and may not have sufficient torsional strength. Accordingly, the second and third honeycomb members 34 and 36 are preferably disposed to intersect in the upward and downward direction thereof.

Meanwhile, the upper and lower panels 10 and 20 may include a steel material, and the reinforcement member 30 may include a plastic material.

The lower panel 20 and the mounting brackets 22 which are basic structures of the sub-frame include a steel material to have sufficient rigidity, and the reinforcement member 30 includes a plastic material for auxiliary rigidity as well as overall rigidity. Especially, since the reinforcement member 30 includes a plastic material, it is possible to reduce the weight of the reinforcement member 30. In addition, since the rigidity of the reinforcement member 30 is secured by the honeycomb structure, the reinforcement member 30 may have a robust structure for supporting the sub-frame.

In the above-mentioned vehicle sub-frame of the present invention, the second honeycomb members 34 are disposed at both sides of the lower panel 20 to robustly support the loads transferred via the chassis members in the state in which the mounting brackets 22 are welded to the lower panel 20.

In the present state, the first honeycomb member 32 defining the overall shape of the lower panel 20 is disposed to the upper portion of the lower panel 20 to robustly support the loads of the gearbox, the stabilizer, the engine, etc., and the respective second honeycomb members 34 and third honeycomb members 36 are disposed at both sides and the front and rear portions of the lower panel 20 to have a robust structure against the overall torsion and lateral loads of the sub-frame.

Accordingly, the reinforcement member 30 having the honeycomb structure is formed between the upper panel 10 and the lower panel 20 to secure the overall rigidity of the sub-frame. In addition, the reinforcement member 30 is additionally disposed in the sub-frame wherein the torsional and flexural strengths of the sub-frame are secured. Since the reinforcement member 30 includes a plastic material to reduce the weight thereof, it is possible to optimally apply the sub-frame to the vehicle.

The column of the first, second and third honeycomb members can take a shape of a pipe. Also, the internal portion of the pipe can be hollow. The internal portion may be partially filled with a soft or hard material configured to absorb an impact energy. Also, the specific pattern of the honeycomb members may include a shape include a circle, an ellipse, a polygon, or so on. The columns of the first, second or third honeycomb members are stacked to each other and then the stacked columns can be attached or welded to each other, wherein the stacked columns are fitted into the position to be disposed and the coupling condition thereof can be maintained.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustrative and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle sub-frame including an upper panel and a lower panel coupled under the upper panel, the vehicle sub-frame further comprising:
   a reinforcement member disposed between the upper panel and the lower panel and having a honeycomb structure in which columns of the reinforcement member with a predetermined pattern are continuously stacked,
   wherein the reinforcement member having the honeycomb structure includes a first honeycomb member which is formed to cover a whole upper surface of the lower panel and in which columns of the first honeycomb member are stacked in a forward and rearward direction and in a lateral direction in a state that the columns of the first honeycomb member are erected on the lower panel, and
   wherein the reinforcement member further includes a second honeycomb member which is disposed at a first side and a second side of the lower panel to extend in the forward and rearward direction and in which columns of the second honeycomb member are perpendicularly stacked with respect to columns of the first honeycomb member.

2. The vehicle sub-frame according to claim 1, wherein the first honeycomb member of the reinforcement member has a center portion that is recessed downward therefrom.

3. The vehicle sub-frame according to claim 1, wherein the lower panel is provided with a plurality of mounting brackets; and
   the second honeycomb member is formed to surround the mounting brackets when the mounting brackets are disposed through the lower panel.

4. The vehicle sub-frame according to claim 1,
   wherein the second honeycomb member is disposed to pass through the first honeycomb member disposed at the first side and the second side of the lower panel in the forward and rearward direction thereof.

5. The vehicle sub-frame according to claim 1, wherein the upper and lower panels include a steel material, and the reinforcement member include a plastic material.

6. A vehicle sub-frame including an upper panel and a lower panel coupled under the upper panel, the vehicle sub-frame further comprising:
   a reinforcement member disposed between the upper panel and the lower panel and having a honeycomb structure in which columns of the reinforcement member with a predetermined pattern are continuously stacked,
   wherein the reinforcement member having the honeycomb structure includes a first honeycomb member which is formed to cover a whole upper surface of the lower panel and in which columns of the first honeycomb member are stacked in a forward and rearward direction and in a lateral direction in a state that the columns of the first honeycomb member are erected on the lower panel, and
   wherein the reinforcement member further includes a third honeycomb member which is disposed at front and rear portions of the lower panel to extend laterally and in which columns of the third honeycomb member are perpendicularly stacked with respect to columns of a second honeycomb member perpendicularly stacked with respect to the columns of the first honeycomb member.

7. The vehicle sub-frame according to claim 6, wherein the third honeycomb member is disposed to laterally pass through the first honeycomb member disposed at the front and rear portions of the lower panel.

8. The vehicle sub-frame according to claim 6, wherein the second honeycomb member is disposed in an upper portion of the lower panel and the third honeycomb member is disposed in a lower portion of the upper panel, wherein the second honeycomb member intersects with the third honeycomb member.

9. The vehicle sub-frame according to claim 6, wherein the upper and lower panels include a steel material, and the reinforcement member include a plastic material.

* * * * *